(12) United States Patent
Qi et al.

(10) Patent No.: US 12,445,851 B2
(45) Date of Patent: Oct. 14, 2025

(54) INTRUSION DETECTION METHOD AND DEVICE FOR IN-VEHICLE CONTROLLER AREA NETWORK

(71) Applicant: NANJING UNIVERSITY OF SCIENCE AND TECHNOLOGY, Jiangsu (CN)

(72) Inventors: Yong Qi, Jiangsu (CN); Yangwei Sun, Jiangsu (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 0 days.

(21) Appl. No.: 18/577,181

(22) PCT Filed: Feb. 23, 2023

(86) PCT No.: PCT/CN2023/077806
§ 371 (c)(1),
(2) Date: Jan. 5, 2024

(87) PCT Pub. No.: WO2023/160600
PCT Pub. Date: Aug. 31, 2023

(65) Prior Publication Data
US 2024/0224041 A1    Jul. 4, 2024

(30) Foreign Application Priority Data
Feb. 23, 2022 (CN) .......................... 202210165407.4

(51) Int. Cl.
*H04W 12/121* (2021.01)
*G06N 20/00* (2019.01)
*H04L 12/40* (2006.01)

(52) U.S. Cl.
CPC .......... *H04W 12/121* (2021.01); *G06N 20/00* (2019.01); *H04L 12/40* (2013.01); *H04L 2012/40215* (2013.01)

(58) Field of Classification Search
None
See application file for complete search history.

(56) References Cited

U.S. PATENT DOCUMENTS

| 2014/0213216 A1* | 7/2014 | Peirce ................. H04W 12/122 455/411 |
| 2015/0262198 A1* | 9/2015 | Bai ........................ B60K 35/00 705/7.31 |

(Continued)

*Primary Examiner* — Raqiul A Choudhury (57) ABSTRACT

The present disclosure belongs to the technical field of security of the Internet of vehicles, and discloses an intrusion detection method and device for an in-vehicle controller area network. The method of the present disclosure includes: digitizing and normalizing collected original data, obtaining preprocessed data, and dividing the preprocessed data into a training set and a test set; conducting feature selection on the preprocessed data through a particle swarm optimization (PSO)-light gradient boosting machine (GBM) bidirectional feature selection method; and classifying test set data subjected to the feature selection with a stacking integrated model, and obtaining an intrusion detection result. The present disclosure is configured to efficiently and accurately detect intrusion information appearing in the in-vehicle controller area network, and prevent security incidents of the Internet of vehicles caused by intrusion into the in-vehicle controller area network.

15 Claims, 6 Drawing Sheets

(56) References Cited

U.S. PATENT DOCUMENTS

| | | | | |
|---|---|---|---|---|
| 2015/0381525 A1* | 12/2015 | Roese | ............... | H04L 67/30 |
| | | | | 709/226 |
| 2017/0005909 A1* | 1/2017 | Hunt | ............... | H04L 69/18 |
| 2023/0003535 A1* | 1/2023 | Miyahara | ............ | G06F 3/017 |
| 2023/0180086 A1* | 6/2023 | Li | ............... | H04W 52/0258 |
| | | | | 455/440 |

* cited by examiner

|  | Normal | Dos | Fuzzy | Imp |
|---|---|---|---|---|
| Train Data | 1020805 | 301699 | 269575 | 598579 |
| Test Data | 425232 | 125303 | 112108 | 187788 |

FIG. 5

| Method | Training time / s | Acc/ % |
|---|---|---|
| Original | 49 | 95.97 |
| Processed | 18 | 96.00 |

FIG. 6

| Method | Pre / % | | | |
|---|---|---|---|---|
|  | Normal | Dos | Fuzzy | Imp |
| Original | 93.93 | 96.50 | 97.00 | 99.99 |
| Processed | 93.96 | 96.57 | 97.08 | 99.99 |

FIG. 7

| Method | ANN | KNN | SVM | MTH-IDS | Proposed Method |
|---|---|---|---|---|---|
| Acc /% | 91.12 | 94.46 | 92.03 | 95.92 | 96.10 |

INTRUSION DETECTION METHOD AND DEVICE FOR IN-VEHICLE CONTROLLER AREA NETWORK

CROSS REFERENCE TO RELATED APPLICATION

This patent application is a national stage application of International Patent Application No. PCT/CN2023/077806, filed on Feb. 23, 2023, which claims the benefit of and priority to Chinese Patent Application 202210165407.4 filed with the Chinese Patent Office on Feb. 23, 2022, each of which is hereby incorporated by reference herein in its entirety.

TECHNICAL FIELD

The present disclosure belongs to the technical field of security of the Internet of vehicles, and particularly relates to an intrusion detection method and device for an in-vehicle controller area network.

BACKGROUND

The traditional automobile industry has been upgraded towards intelligence and networking thanks to development of emerging technologies such as the 5th generation mobile communication technology (5G) and artificial intelligence. The Internet of vehicles, a principal communication framework of intelligent connected vehicles, enables reliable communication between vehicles and other entities of the Internet of vehicles. With the Internet of vehicles, people, vehicles, roads, clouds, etc. are network-linked by integrating a vehicle intranet, an inter-vehicle network, and a mobile in-vehicle Internet. The vehicle intranet transmits controller area network (CAN) messages and executes operations mainly through a CAN. Gradually, the Internet of vehicles begins to suffer network attacks like the traditional Internet along with accelerating intelligence and networking of the Internet of vehicles technology. With limited CAN compatibility, the vehicle intranet is vulnerable to network attacks because it is incompatible with traditional network security mechanisms, such as authentication mechanisms, secure communication strategies and encryption technologies. In 2020, related enterprise platforms such as information service providers of the Internet of vehicles of vehicle enterprises suffered 2.8 million malicious attacks or so. These potential network attacks seriously endanger life safety of users of the intelligent connected vehicles. A majority of traditional network security technologies, such as data encryption, antivirus programs, are merely passive prevention technologies. They cannot grasp network security status in time and offer real-time protection, and obviously are not suitable for an environment of the Internet of vehicles. As an active security technology, intrusion detection can intercept attacks before the network suffers the attacks, thereby gradually evolving into an important part in security research of the Internet of vehicles.

Related researchers have put forward a variety of solutions for problems of detection of intrusion into an in-vehicle controller area network. Most solutions are intrusion detection methods based on statistics or machine learning and a deep learning model. Song et al. proposed an intrusion detection method based on CAN message time interval analysis. The method can accurately detect message injection attacks on the in-vehicle controller area network. Ghaleb et al. proposed an intrusion detection model based on a feedforward and back propagation artificial neural network (ANN) for an in-vehicle controller area network. Further, they conduct a simulation experiment on a real intrusion data set next generation simulation (NGSIM) of the Internet of vehicles. Experimental results indicated that the model had a better detection effect than an existing baseline model. Alshammari et al. analyzed the data in the vehicular ad hoc network through traditional machine learning algorithms, a k-nearest neighbor (KNN) algorithm and a support vector machine (SVM) algorithm, and predicted whether network intrusion occurred. Yang et al. proposed a multilayer hybrid intrusion detection system (MTH-IDS) for detection of intrusion into the Internet of vehicles. The system has higher accuracy and a lower false alarm rate.

With artificial intelligence growing, deep learning has been gradually applied to detection of intrusion into the in-vehicle controller area network. Despite high accuracy, deep learning methods generally carry high computation cost due to model complexity. Therefore, they are obviously not suitable for in-vehicle systems with low computing capability. Machine learning is more efficient than deep learning. Machine learning and data mining algorithms have been hailed as effective models for designing intrusion detection systems. In view of this, it is urgent to design an efficient and accurate intrusion detection method for an in-vehicle controller area network on the basis of machine learning.

SUMMARY

In order to overcome the defects in the prior art, the present disclosure aims to provide an intrusion detection method and device for an in-vehicle controller area network, such that intrusion information appearing in the in-vehicle controller area network can be efficiently and accurately detected, and security incidents of the Internet of vehicles caused by intrusion into the in-vehicle controller area network can be prevented.

Specifically, the present disclosure is implemented by the following technical solutions.

In an aspect, the present disclosure provides an intrusion detection method for an in-vehicle controller area network. The method includes:

digitizing and normalizing collected original data, obtaining preprocessed data, and dividing the preprocessed data into a training set and a test set;

conducting feature selection on the preprocessed data through a particle swarm optimization (PSO)-light gradient boosting machine (GBM) bidirectional feature selection method; and classifying test set data subjected to the feature selection with a stacking integrated model, and obtaining an intrusion detection result.

The PSO-LightGBM bidirectional feature selection method includes:

firstly conducting parameter optimization on a LightGBM with a PSO algorithm such that an overall model effect is optimal; then arranging feature importance in descending order with the LightGBM, selecting all sorted feature sets, deleting a feature having least importance from a current feature set each time such that a new feature subset is formed, conducting feature deletion on data according to the new feature subset, and conducting classification prediction by means of the stacking integrated model; cyclically deleting, if precision of a prediction result is not reduced, a feature having least importance, and conducting feature deletion on the new feature subset; and withdrawing, if precision of a prediction result is reduced, feature deletion, ending the feature deletion, and returning a data set containing only features after feature deletion.

Further, the intrusion detection method for an in-vehicle controller area network further includes:

conducting mixed sampling on preprocessed training set data through a clustering and mixed sampling method, removing redundancy, and generating a minority of attacked samples; and conducting feature selection on data subjected to clustering and mixed sampling through the PSO-LightGBM bidirectional feature selection method, and training the stacking integrated model with the training set data subjected to the feature selection. The clustering and mixed sampling method includes:

analyzing the preprocessed training set data, and determining whether extreme imbalance of all classes exists;

conducting clustering on all classes of training set data with Kmeans in the absence of extreme imbalance of samples, selecting a set proportion of data from a clustering center such that a highly-representative data subset is formed, conducting data cleaning on the data subset through a Tomek Link method, and using cleaned data as a new training set;

collecting a set proportion of data from each clustering center and removing redundancy for a majority in the presence of extreme imbalance of all classes of data, and conducting interpolation according to a clustering center through a synthetic minority oversampling technique (SMOTE) and generating additional samples for a minority, where an interpolation and generation method is as follows:

$$X_{new} = X_i + (X_i' + X_i) \times \delta$$

where $X_{new}$ denotes a newly generated sample, $X_i$ denotes a clustering center sample point, $X'_i$ denotes a selected K neighbor point, and $\delta \in [0,1]$ denotes a random number; and splicing a majority of sampled samples and a minority of samples generated through the SMOTE, and obtaining a data set to be determined; and eliminating noise sample points from the data set to be determined through a Tomek Link sampling method, and obtaining training set data subjected to clustering and mixed sampling.

Further, the conducting interpolation according to a clustering center through an SMOTE and generating additional samples include: conducting secondary clustering on the basis of first clustering so as to generate a clustering center for a minority, and generating a minority of data of the same type through the SMOTE according to a clustering center of the secondary clustering.

Further, the extreme imbalance indicates that a sample ratio of a majority to a minority is greater than 100:1.

Further, the stacking integrated model is divided into two layers. A first layer obtains preliminary classification results through quintuple cross-validation with an XGBoost model, a LightGBM model and a CatBoost model, and the preliminary classification results are used as features for transverse splicing, such that a new training set is obtained. A second layer trains a multilayer perceptron (MLP) model with the new training set, such that a final stacking integrated model is obtained.

In another aspect, the present disclosure further provides an intrusion detection device for an in-vehicle controller area network. The device includes a memory and a processor. The memory stores a computer program configured to implement the above-mentioned intrusion detection method for an in-vehicle controller area network, and the processor executes the computer program.

In yet another aspect, the present disclosure provides a computer-readable storage medium, which stores a computer program. The computer program implements steps of the above-mentioned intrusion detection method for an in-vehicle controller area network when being executed by a processor.

The intrusion detection method and device for an in-vehicle controller area network of the present disclosure have the following beneficial effects:

According to the intrusion detection method and device for an in-vehicle controller area network of the present disclosure, in the presence of the extreme imbalance of all the classes of data, clustering is conducted on the majority, a plurality of clustering centers are selected, and sampling is conducted on each clustering center. In this way, diversity of a majority of data can be ensured, redundancy of the majority can be removed, and accuracy of model prediction can be improved to some extent. For the minority, firstly, clustering is conducted to obtain a plurality of clustering centers of the minority, interpolation is conducted according to the clustering centers through the SMOTE, and the additional samples are generated. In this way, the generated new samples cannot be greatly different from the original samples. The majority of sampled samples and the minority of samples generated through the SMOTE are spliced, and the data set to be determined is obtained. Inter-class overlapped samples in the data set to be determined are cleaned off through the Tomek Link sampling method, such that samples that are nearest neighbors belong to the same class, and further prediction can be better conducted.

According to the intrusion detection method and device for an in-vehicle controller area network of the present disclosure, feature selection is conducted on the test set and the training set subjected to clustering and mixed sampling, and a feature combination having an optimal overall model effect is selected through the PSO-LightGBM bidirectional feature selection method. The feature importance and model accuracy are considered comprehensively, such that a left feature subset can be ensured to contain no useless features, and model accuracy is high. Through data validation of the in-vehicle controller area network, data subjected to clustering and mixed sampling and PSO-LightGBM bidirectional feature selection in the intrusion detection method for an in-vehicle controller area network of the present disclosure has a certain improvement in detection accuracy and obvious reduction in training time used.

According to the intrusion detection method and device for an in-vehicle controller area network of the present disclosure, clustering and mixed sampling are conducted on training data, such that redundancy of the data is greatly reduced; meanwhile, oversampling is conducted on the minority of data, such that the model can be ensured to accurately identify a minority of attacks; through a feature selection method, a speed and accuracy of model training are further improved; and finally, a plurality of models are integrated by means of the stacking integrated model, such that stability and accuracy of detection are improved. In this way, the intrusion information appearing in the in-vehicle controller area network can be well and quickly detected under the condition of limited computing capability. Compared with other existing methods, the method of the present disclosure has higher detection accuracy and detection precision and a lower detection omission rate in terms of detection of intrusion into the in-vehicle controller area network. It is indicated that the method of the present disclosure can better identify the intrusion information and has better practical feasibility to some extent.

DETAILED DESCRIPTION OF THE EMBODIMENTS

The present disclosure is further described in detail below with reference to embodiments and accompanying drawings.

Embodiment 1

Figure 1:
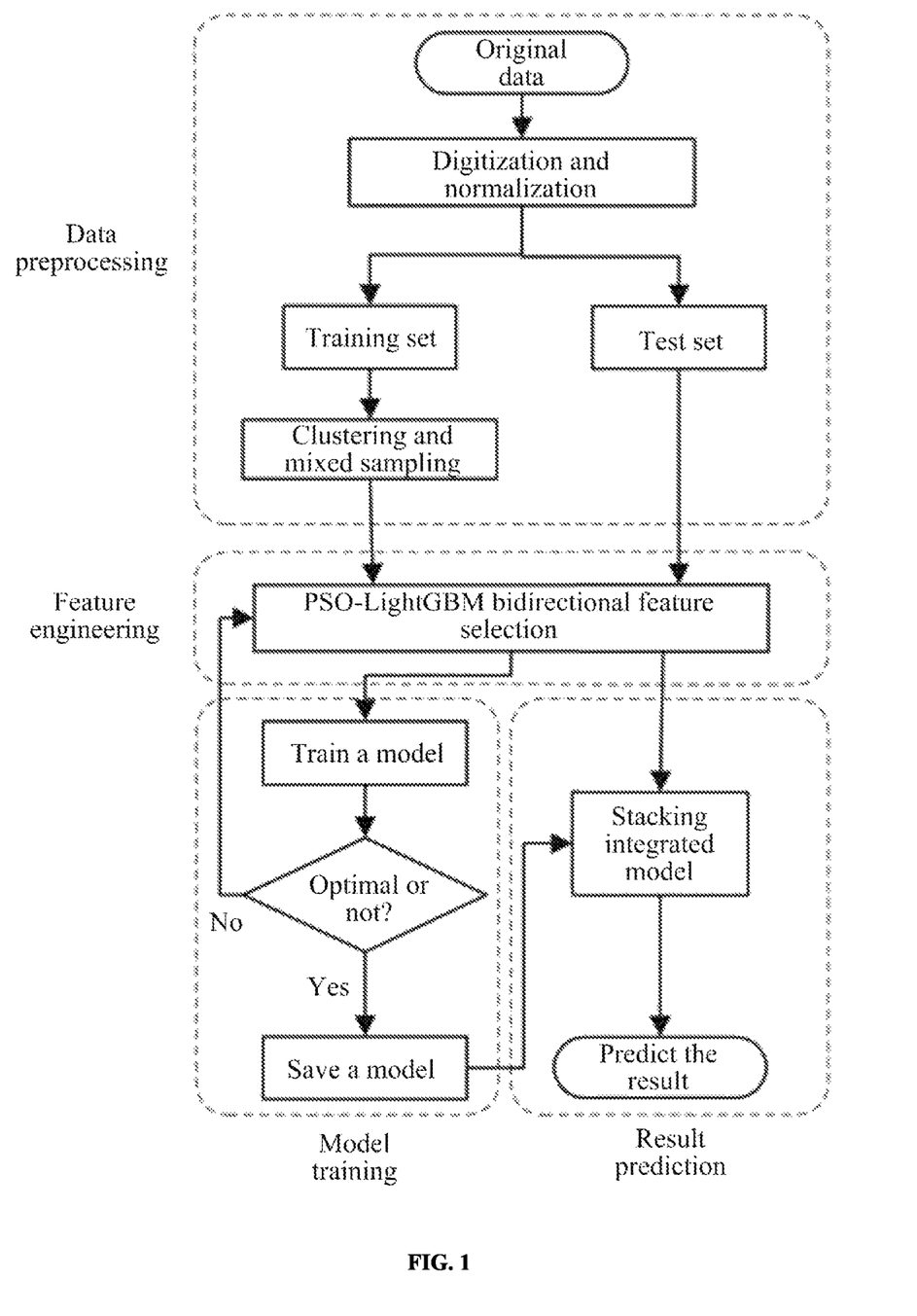
FIG. 1 is a flow diagram of an intrusion detection method for an in-vehicle controller area network of the present disclosure.
Figure 2:
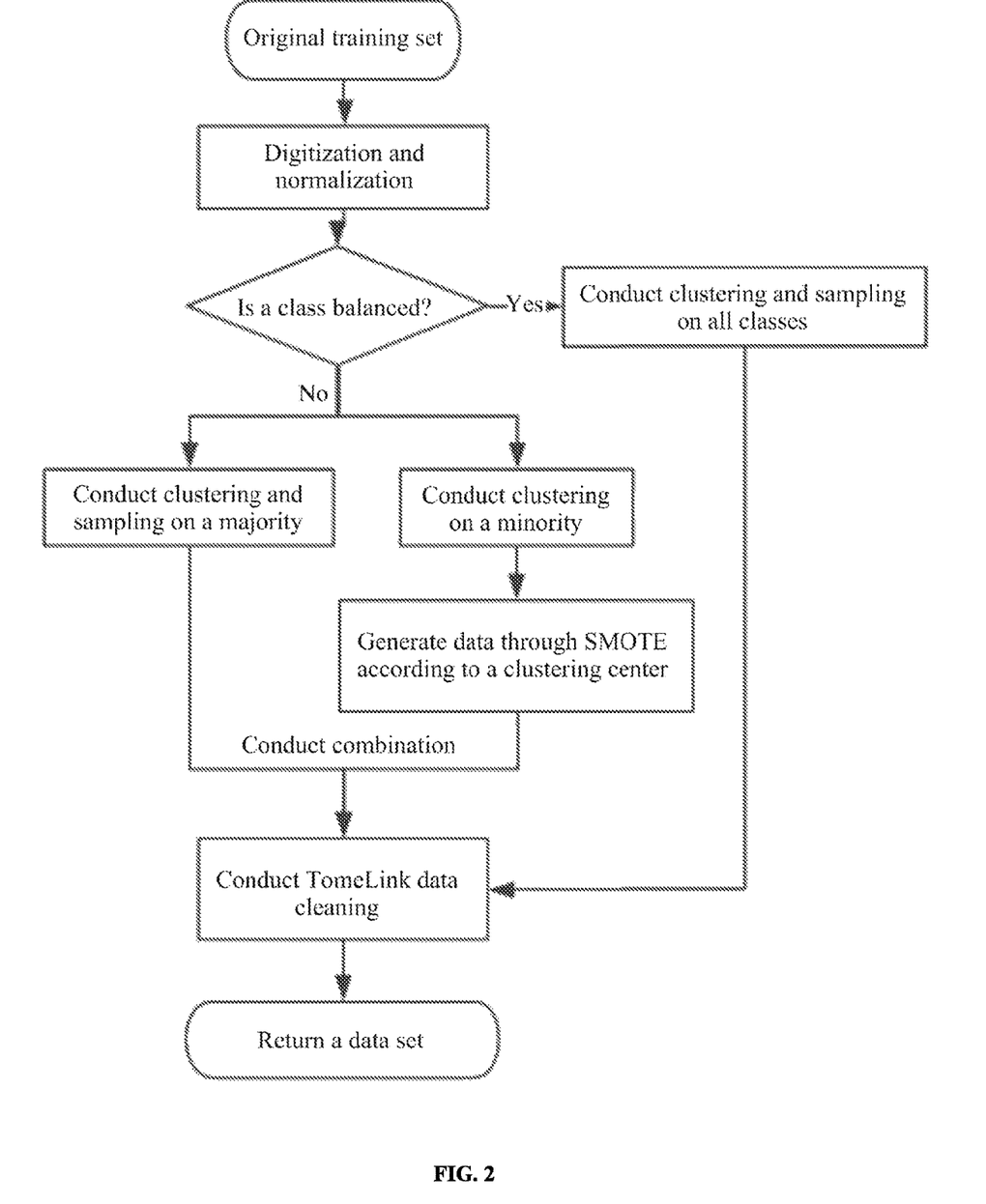
FIG. 2 is a flow diagram of an algorithm of clustering and mixed sampling of the present disclosure.

An embodiment of the present disclosure provides an intrusion detection method for an in-vehicle controller area network. As shown in FIG. 1, the method includes the following steps:

1, Collected original data is digitized and normalized, preprocessed data is obtained, and the preprocessed data is divided into a training set and a test set, as shown in FIG. 2.

In the embodiment, with a data set of detection of intrusion into the in-vehicle controller area network of a human-centered robotics (HCR) laboratory an example, the collected original data is digitized, and data having a data field length of 8 is selected. The data set has features such as a timestamp, an identity (ID), a data length code (DLC), and data. ID is an identifier of a controller area network (CAN) message, which is a hexadecimal number. DLC is a number of bytes of data. Data is CAN message data, with 0-8 bytes. In order to avoid influence of different feature dimensions on a model, the data is normalized to remove the dimensions, with a computation formula as follows:

$$x'_i = \frac{x_i - x_{min}}{x_{max} - x_{min}}$$

$x'_i$ denotes normalized data, $x_i$ denotes original feature data, $x_{min}$ denotes a minimum value in the feature data, and $x_{max}$ denotes a maximum value in the feature data.

The preprocessed data is divided into the training set and the test set.

Mixed sampling is conducted on preprocessed training set data through a clustering and mixed sampling method, redundancy is removed, and a minority of attacked samples are generated, such that training set data subjected to clustering and mixed sampling is obtained. Feature selection is conducted on the data subjected to clustering and mixed sampling through a particle swarm optimization (PSO)-light gradient boosting machine (GBM) bidirectional feature selection method, and a stacking integrated model is trained with the training set data subjected to the feature selection. The trained stacking integrated model is obtained to predict test set data. The clustering and mixed sampling method of the present disclosure includes the following steps:

Firstly, the preprocessed training set data is analyzed, and whether extreme imbalance of all classes exists is determined.

In the absence of extreme imbalance of samples, clustering is conducted on all classes of training set data directly with Kmeans, a set proportion of data is selected from a clustering center such that a highly-representative data subset is formed, data cleaning is conducted directly on the data subset through a Tomek Link method, and cleaned data is used as a new training set. Kmeans clustering and sampling is different from random sampling and proportional sampling. The clustering aims to minimize the sum of squares of a distance from each data point to a corresponding clustering center, such that similar data may be classified into the same cluster. Sampling is conducted in different clusters, and most of redundant data may be discarded. Therefore, the Kmeans clustering and sampling may reduce a data size without losing important information.

In the presence of extreme imbalance of all classes of data of samples, a majority and a minority are processed separately. Finally, a majority of sampled samples and a minority of samples generated through a synthetic minority oversampling technique (SMOTE) are spliced, and a data set to be determined is obtained. The step is specifically as follows:

For the majority, a set proportion of data is collected from each clustering center, and redundancy is removed.

For the minority, interpolation is conducted according to a clustering center through the SMOTE, and additional samples are generated. An interpolation and generation method is as follows:

$$X_{new} = X_i + (X'_i + X_i) \times \delta$$

$X_{new}$ denotes a newly-generated sample, $X_i$ denotes a clustering center sample point, $X'_i$ denotes a selected K neighbor point, and $\delta \in [0,1]$ denotes a random number.

Preferably, in another embodiment, for the minority, secondary clustering is conducted on the basis of a clustering center formed by conducting first clustering on the minority, and a minority of data of the same class is generated through the SMOTE according to a clustering center of the secondary clustering.

In this case, the data set to be determined cannot be used directly, because a data set generated through the SMOTE may contain some inter-class overlapped samples. Existence of such sample points generally leads to difficulty in classification. The present disclosure eliminates noise sample points from the data set to be determined through a Tomek Link sampling method, and obtains training set data subjected to clustering and mixed sampling. A basic idea is to enable two nearest samples belonging to different classes to constitute a Tomek Link pair, or enable one of two nearest samples belonging to different classes to be noise, or enable two nearest samples belonging to different classes to be both near a boundary. The inter-class overlapped samples may be cleaned off by removing the Tomek Link pair, such that samples that are nearest neighbors all belong to the same class, and further prediction can be better conducted.

Figure 3:
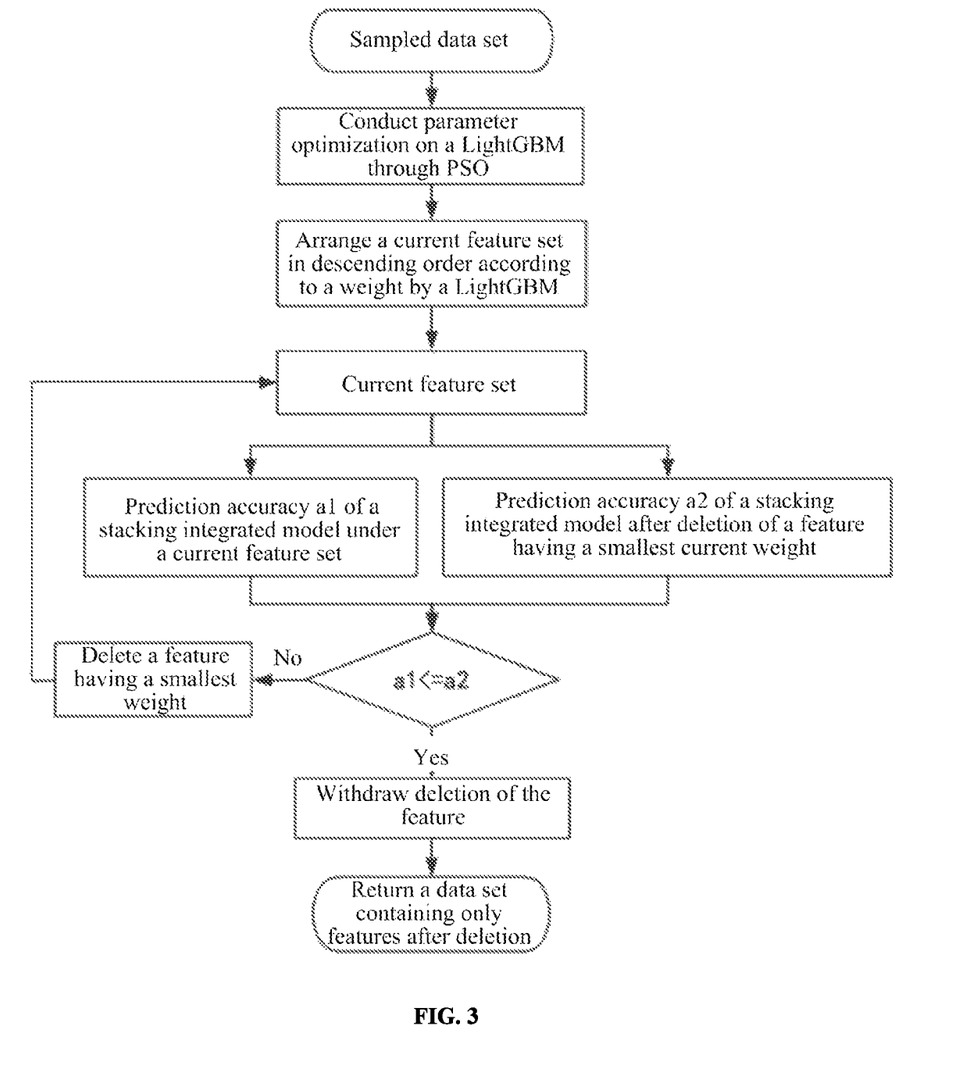
FIG. 3 is a flow diagram of an algorithm of particle swarm optimization (PSO)-light gradient boosting machine (GBM) bidirectional feature selection of the present disclosure.

2, Feature selection is conducted on the preprocessed data through the PSO-LightGBM bidirectional feature selection method.

In the intrusion detection method for an in-vehicle controller area network of the present disclosure, feature selection is conducted on the preprocessed data through the PSO-LightGBM bidirectional feature selection method. The step includes the following steps that feature selection is conducted on the test set during intrusion detection, and feature selection is conducted on the training set subjected to clustering and mixed sampling during model training.

The present disclosure selects a feature combination having an optimal overall model effect through the PSO-LightGBM bidirectional feature selection method.

As shown in FIG. 3, the PSO-LightGBM bidirectional feature selection method of the present disclosure includes the following steps: firstly, parameter optimization is conducted on a LightGBM with a PSO algorithm such that an overall model effect is optimal; then feature importance is arranged in descending order with the LightGBM, all sorted feature sets are selected, a feature having least importance is deleted from a current feature set each time such that a new feature subset is formed, feature deletion is conducted on the preprocessed data according to the new feature subset, and classification prediction is conducted by means of the stacking integrated model; if precision of a prediction result is not reduced, a feature having least importance is deleted cyclically, and feature deletion is conducted on the new feature subset; and if precision of a prediction result is reduced, feature deletion is withdrawn, the feature deletion is ended, and a data set containing only features after feature deletion is returned.

According to the PSO-LightGBM bidirectional feature selection method of the present disclosure, the feature importance and model accuracy are considered comprehensively, such that a left feature subset can be ensured to contain no useless features, and model accuracy is high.

Figure 4:
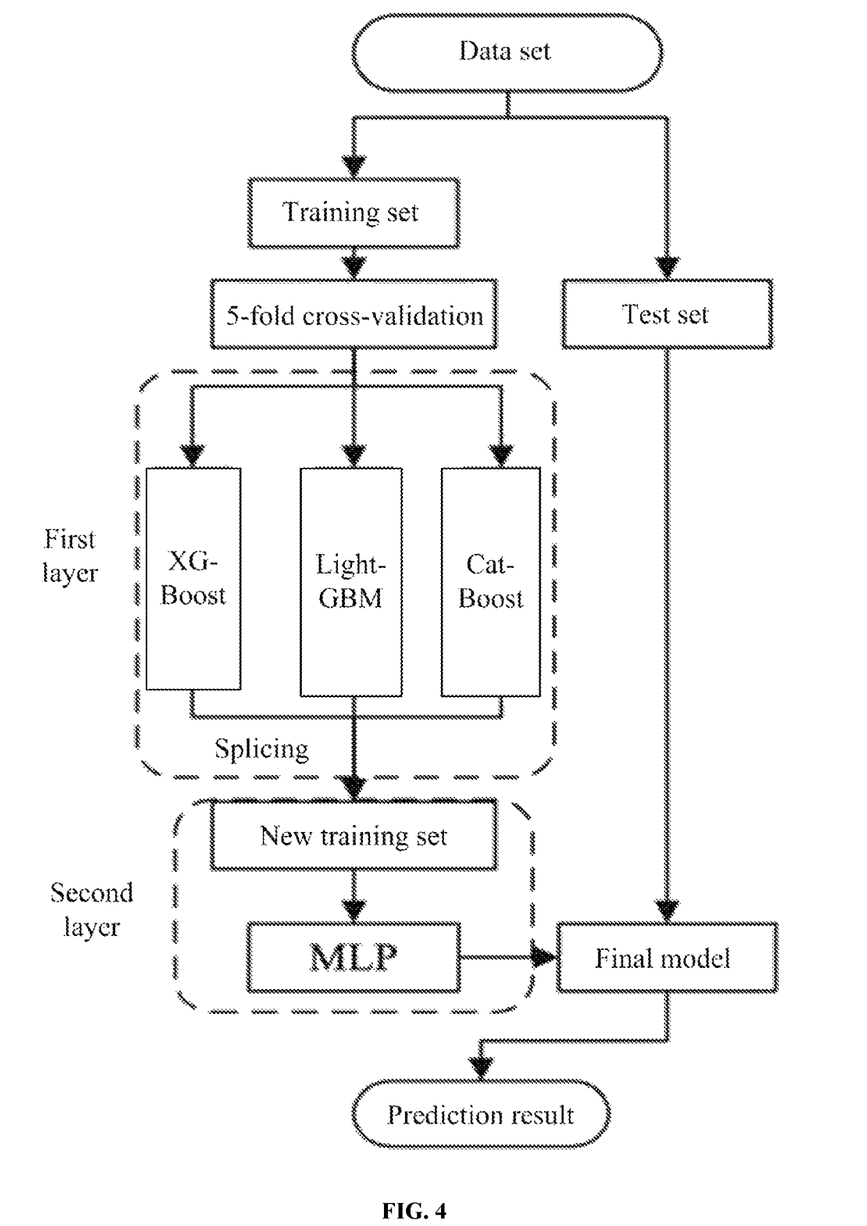
FIG. 4 is a flow diagram of a training method for a stacking integrated model of the present disclosure.

3, The stacking integrated model is trained with the training set data subjected to data preprocessing and feature selection, and the trained stacking integrated model is saved. The trained stacking integrated model is configured for detection of intrusion into the in-vehicle controller area network.

As shown in FIG. 4, the stacking integrated model of the present disclosure is mainly divided into two layers. A first layer obtains preliminary classification results through quintuple cross-validation with an XGBoost model, a LightGBM model and a CatBoost model, the preliminary classification results are used as features for transverse splicing, and a spliced result is saved, such that a new training set. A second layer trains a multilayer perceptron (MLP) model with data spliced with the first layer (new training set data), such that a final stacking integrated model is obtained.

4, Intrusion detection prediction is conducted on test set data subjected to the feature selection with the stacking integrated model trained in step 3, and a final intrusion detection result is obtained.

Figure 5:
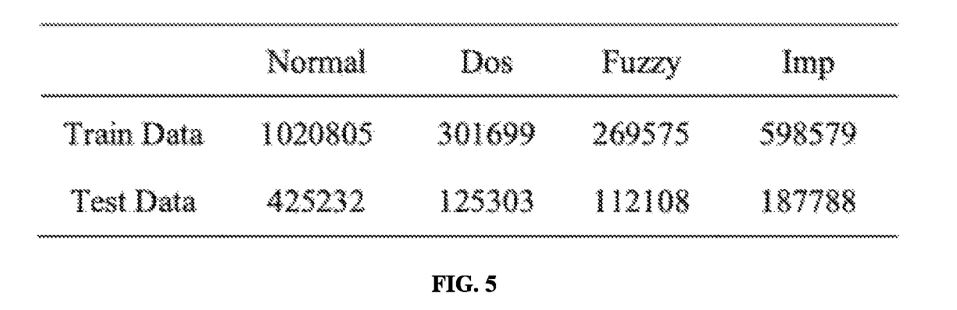
FIG. 5 is a schematic diagram of a training set and a test set of the present disclosure.
Figure 6:
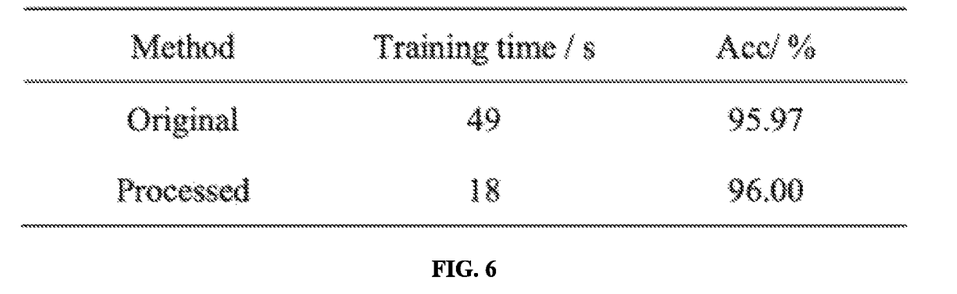
FIG. 6 is a schematic comparison diagram of training time and detection accuracy of training and detecting with an original data set and a data set subjected to clustering and mixed sampling and bidirectional feature selection according to the present disclosure.
Figure 7:
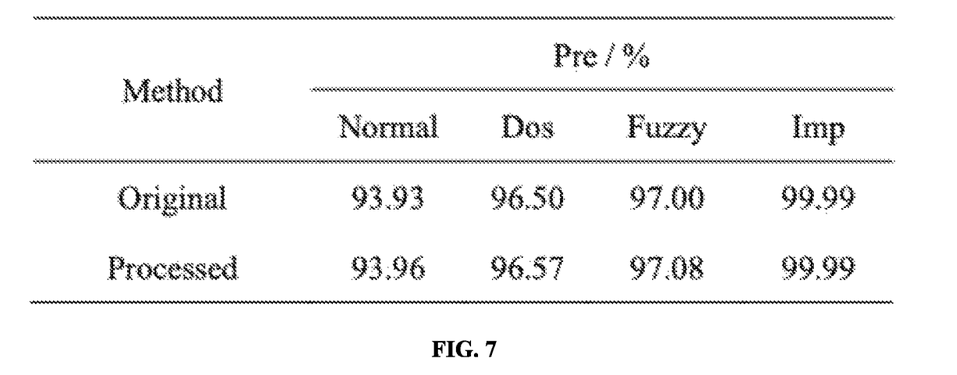
FIG. 7 is a schematic diagram of precision of each class of testing with an original data set and a data set subjected to clustering and mixed sampling and bidirectional feature selection according to the present disclosure.

In order to verify validity of clustering and mixed sampling and PSO-LightGBM bidirectional feature selection in the present disclosure, training and prediction are conducted through the LightGBM with an original in-vehicle controller area network training set and an in-vehicle controller area network training set subjected to clustering and mixed sampling and PSO-LightGBM bidirectional feature selection. Training data and test data are shown in FIG. 5, and results are shown in FIGS. 6 and 7. It may be seen that data subjected to clustering and mixed sampling and PSO-LightGBM bidirectional feature selection has a certain improvement in detection accuracy and obvious reduction in training time used, which indicates that the proposed method is effective.

Figure 8:
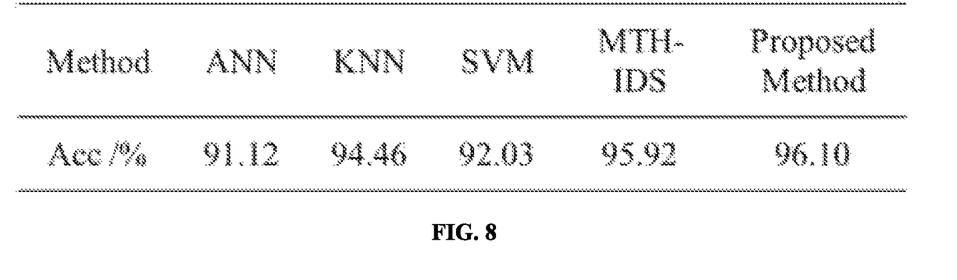
FIG. 8 is a schematic comparison diagram of detection accuracy of a method of the present disclosure and existing methods (an artificial neural network (ANN), a k-nearest neighbor (KNN), a support vector machine (SVM), and a multilayer hybrid intrusion detection system (MTH-IDS))
Figure 9:
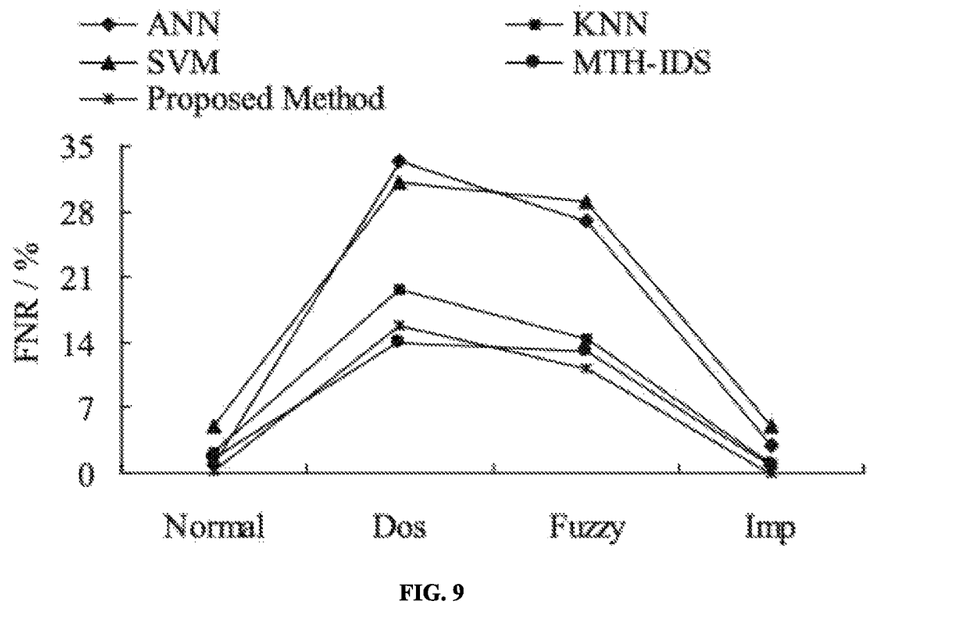
FIG. 9 is a schematic comparison diagram of a detection omission rate of each class of a method of the present disclosure and existing methods (an ANN, a KNN, an SVM, and an MTH-IDS)
Figure 10:
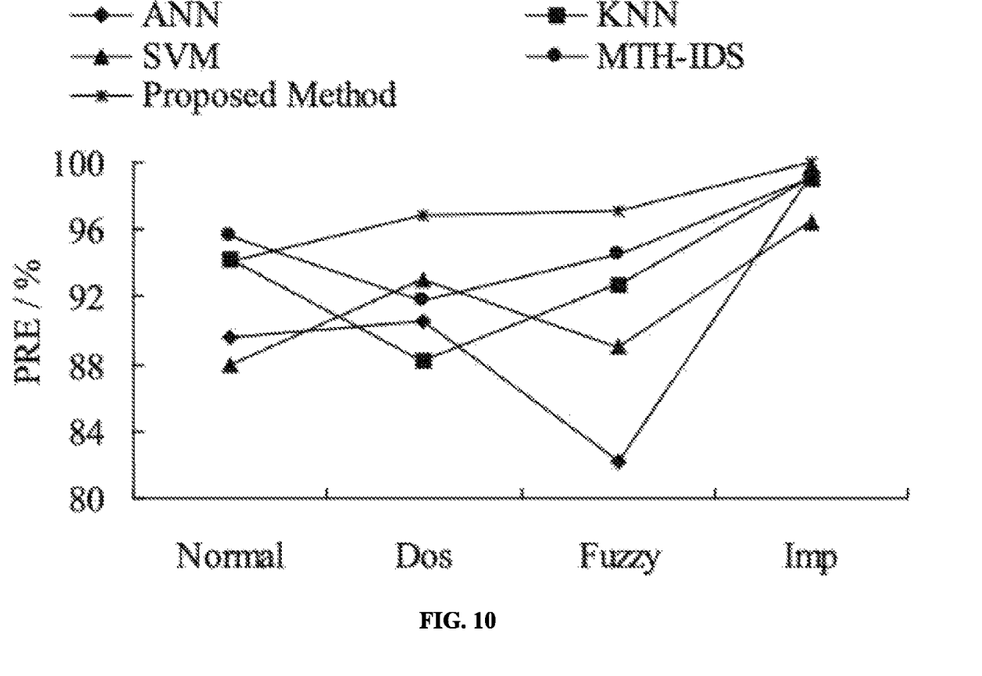
FIG. 10 is a schematic comparison diagram of detection precision of each class of a method of the present disclosure and existing methods (an ANN, a KNN, an SVM, and an MTH-IDS).

In order to verify that the method of the present disclosure has better effect and stability than an existing method, an in-vehicle controller area network data set after the same processing is used for verification, and results are shown in FIGS. 8, 9 and 10. Based on analysis of the above experimental results, it may be seen that the method of the present disclosure has a better and more stable detection effect in detection of intrusion into the in-vehicle controller area network. It is indicated that the method of the present disclosure can better identify the intrusion information and has better practical feasibility to some extent.

In some embodiments, some aspects of the technology described above may be implemented by one or more processors of a processing system executing software. The software includes one or more executable instruction sets that are stored or tangibly implemented in other ways on a non-transient computer-readable storage medium. The software may include instructions and some data. The instructions and some data manipulate the one or more processors to execute one or more aspects of the technology described above when being executed by one or more processors. The non-transient computer-readable storage medium may include, for example, magnetic or optical disk storage devices, such as solid-state storage devices like a flash memory, a cache and a random access memory (RAM), or other nonvolatile memory devices. Executable instructions stored on the non-transient computer-readable storage medium may be source codes, assembly language codes, target codes, or in other instruction formations explained or executed in other ways by one or more processors.

The computer-readable storage medium may include any storage medium accessible by a computer system to provide instructions and/or data for the computer systems during use or a combination of storage media. Such storage media may include, but are not limited to, an optical medium (e.g., a compact disc (CD), a digital versatile disc (DVD), or a blue-ray disc), a magnetic medium (e.g., a floppy disc, a magnetic tape, or a magnetic hard drive), a volatile memory (e.g., a random access memory (RAM) or a cache), a nonvolatile memory (e.g., a read-only memory (ROM) or a flash memory), or a storage medium based on a micro electro mechanical system (MEMS). The computer-readable storage medium may be embedded in a computing system (e.g., a system RAM or ROM), fixedly attached to a computing system (e.g., a magnetic hard drive), removably attached to a computing system (e.g., a CD or a flash memory based on a universal serial bus (USB)), or coupled to a computer system via a wired or wireless network (e.g., network accessible storage (NAS)).

It is to be noted that not all actions or elements in the above general description are essential and a specific action or part of a device may be not essential. Moreover, one or more further actions or included elements may be executed in addition to those described. Still further, a sequence of actions listed is not necessarily a sequence of executing the actions. Moreover, these concepts have been described with reference to specific embodiments. However, those of ordinary skill in the art should understand that various modifications and changes can be made without departing from the scope of the present disclosure set forth in the appended claims. Therefore, the description and the accompanying drawings are considered to be illustrative rather than limiting, and all such modifications are included within the scope of the present disclosure.

Benefits, other advantages and solutions to problems have been described above with respect to the specific embodiments. However, benefits, advantages and solutions to problems that may cause any benefit, advantage or solution to occur or become more apparent and any feature should not be construed as critical or necessary features for any or other aspects or essential features for any or all claims. Moreover, the specific embodiments described above are merely illustrative because the disclosed subject matter can be modified and implemented in such way that is obviously different but equivalent for those skilled in the art who benefit from the teaching herein. In addition to what are described in the claims, it is not intended to limit configurations shown herein or designed details. Therefore, it is obvious that the specific embodiments disclosed above can be changed or modified and all such changes are considered to fall within the scope of the disclosed subject matter.

What is claimed is:

1. An intrusion detection method for an in-vehicle controller area network, comprising:
   digitizing and normalizing collected original data, obtaining preprocessed data, and dividing the preprocessed data into a training set and a test set;
   conducting feature selection on the preprocessed data through a particle swarm optimization (PSO)-light gradient boosting machine (GBM) bidirectional feature selection method; and
   classifying test set data subjected to the feature selection with a stacking integrated model, and obtaining an intrusion detection result, wherein
   the PSO-LightGBM bidirectional feature selection method comprises:
   firstly conducting parameter optimization on a LightGBM with a PSO algorithm; then arranging feature importance in descending order with the LightGBM, selecting all sorted feature sets, deleting a feature having least importance from a current feature set each time such that a new feature subset is formed, conducting feature deletion on data according to the new feature subset, and conducting classification prediction by means of the stacking integrated model; cyclically deleting, if precision of a prediction result is not reduced, a feature having least importance, and conducting feature deletion on the new feature subset; and withdrawing, if precision of a prediction result is reduced, feature deletion, ending the feature deletion, and returning a data set containing only features after feature deletion.

2. The intrusion detection method for an in-vehicle controller area network according to claim 1, further comprising:
   conducting mixed sampling on preprocessed training set data through a clustering and mixed sampling method, removing redundancy, and generating a minority of attacked samples; and conducting feature selection on data subjected to clustering and mixed sampling through the PSO-LightGBM bidirectional feature selection method, and training the stacking integrated model with the training set data subjected to the feature selection, wherein the clustering and mixed sampling method comprises:
   analyzing the preprocessed training set data, and determining whether extreme imbalance of all classes exists;
   conducting clustering on all classes of training set data with Kmeans in the absence of extreme imbalance of samples, selecting a set proportion of data from a clustering center such that a highly-representative data subset is formed, conducting data cleaning on the data subset through a Tomek Link method, and using cleaned data as a new training set;
   collecting a set proportion of data from each clustering center and removing redundancy for a majority in the presence of extreme imbalance of all classes of data, and conducting interpolation according to a clustering center through a synthetic minority oversampling technique (SMOTE) and generating additional samples for a minority, wherein an interpolation and generation method is as follows:

$$X_{new} = X_i + (X'_i + X_i) \times \delta$$

wherein $X_{new}$ denotes a newly-generated sample, $X_i$ denotes a clustering center sample point, $X'_i$ denotes a selected K neighbor point, and $\delta \in [0,1]$ denotes a random number; and
splicing a majority of sampled samples and a minority of samples generated through the SMOTE, and obtaining a data set to be determined; and eliminating noise sample points from the data set to be determined through a Tomek Link sampling method, and obtaining training set data subjected to clustering and mixed sampling.

3. The intrusion detection method for an in-vehicle controller area network according to claim 2, wherein the conducting interpolation according to a clustering center through an SMOTE and generating additional samples comprise: conducting secondary clustering on the basis of first clustering so as to generate a clustering center for a minority, and generating a minority of data of the same type through the SMOTE according to a clustering center of the secondary clustering.

4. The intrusion detection method for an in-vehicle controller area network according to claim 2, wherein the extreme imbalance indicates that a sample ratio of a majority to a minority is greater than 100:1.

5. The intrusion detection method for an in-vehicle controller area network according to claim 2, wherein the stacking integrated model is divided into two layers, wherein a first layer obtains preliminary classification results through quintuple cross-validation with an XGBoost model, a LightGBM model and a CatBoost model, and the preliminary classification results are used as features for transverse splicing, such that a new training set is obtained; and a second layer trains a multilayer perceptron (MLP) model with the new training set, such that a final stacking integrated model is obtained.

6. An intrusion detection device for an in-vehicle controller area network, comprising a memory and a processor, wherein the memory stores a computer program configured to implement the intrusion detection method for an in-vehicle controller area network according to claim 1, and the processor executes the computer program.

7. A non-transitory computer-readable storage medium, storing a computer program, wherein the computer program implements steps of the intrusion detection method for an in-vehicle controller area network according to claim 1 when being executed by a processor.

8. An intrusion detection device for an in-vehicle controller area network, comprising a memory and a processor, wherein the memory stores a computer program configured to implement the intrusion detection method for an in-vehicle controller area network according to claim 2, and the processor executes the computer program.

9. An intrusion detection device for an in-vehicle controller area network, comprising a memory and a processor, wherein the memory stores a computer program configured to implement the intrusion detection method for an in-vehicle controller area network according to claim 3, and the processor executes the computer program.

10. An intrusion detection device for an in-vehicle controller area network, comprising a memory and a processor, wherein the memory stores a computer program configured to implement the intrusion detection method for an in-vehicle controller area network according to claim 4, and the processor executes the computer program.

11. An intrusion detection device for an in-vehicle controller area network, comprising a memory and a processor, wherein the memory stores a computer program configured to implement the intrusion detection method for an in-vehicle controller area network according to claim 5, and the processor executes the computer program.

12. A non-transitory computer-readable storage medium, storing a computer program, wherein the computer program implements steps of the intrusion detection method for an in-vehicle controller area network according to claim 2 when being executed by a processor.

13. A non-transitory computer-readable storage medium, storing a computer program, wherein the computer program implements steps of the intrusion detection method for an in-vehicle controller area network according to claim 3 when being executed by a processor.

14. A non-transitory computer-readable storage medium, storing a computer program, wherein the computer program implements steps of the intrusion detection method for an in-vehicle controller area network according to claim 4 when being executed by a processor.

15. A non-transitory computer-readable storage medium, storing a computer program, wherein the computer program implements steps of the intrusion detection method for an in-vehicle controller area network according to claim 5 when being executed by a processor.

\* \* \* \* \*